United States Patent Office 3,482,587
Patented Dec. 9, 1969

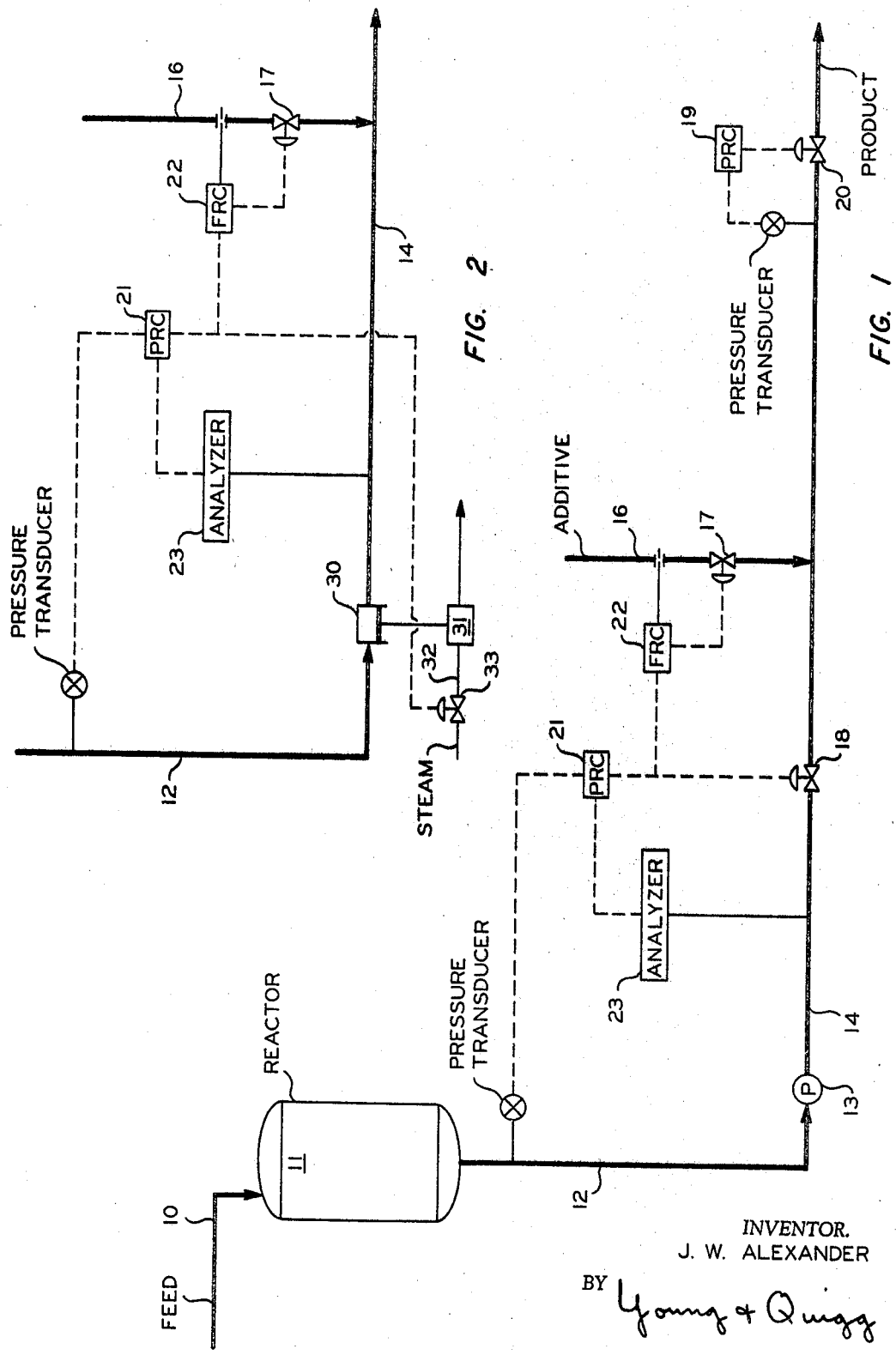

3,482,587
BLENDING METHOD AND APPARATUS
James W. Alexander, Borger, Tex., assignor to Phillips Petroleum Company, a corporation of Delaware
Continuation-in-part of application Ser. No. 363,006, Apr. 27, 1964. This application Oct. 31, 1966, Ser. No. 594,970
Int. Cl. G05d *11/13*
U.S. Cl. 137—7                    11 Claims

ABSTRACT OF THE DISCLOSURE

A fluid blending system comprises a first conduit to convey a first fluid and a second conduit joined thereto to introduce a second fluid. Pressure is measured in the first conduit upstream of the junction, and a signal representative thereof controls flows through both conduits. Flow through the first conduit is adjusted by either a valve or a variable speed pump. An analyzer measures composition of the fluid in the first conduit, and further adjusts the two flows.

This application is a continuation-in-part of copending application Ser. No. 363,006, filed Apr. 27, 1964, now abandoned.

This invention relates to a blending process and apparatus therefor. In another aspect, this invention relates to an improved blending method and apparatus therefor wherein two process streams are blended and wherein the rate of flow of one of the blended streams is difficult to measure.

In a conventional emulsion polymerization process employed to produce a rubbery polymer, a typical polymerization recipe includes a conjugated monomeric diene which can be either a conjugated diene alone or together with an unsaturated organic material copolymerizable therewith, water, a modifier, an oxidant, an emulsifier and an activator comprising an alkali metal, pyrophosphate and ferrous sulfate heptahydrate. Latex produced in the polymerization zone containing some unreacted monomer is withdrawn from the polymerization reaction zone and contacted with a suitable short-stopping agent. It is advisable to add the short-stopping agent to the latex so as to maintain the proportion of short-stopping agent to latex substantially constant. Conventionally, the addition of the short-stopping agent to the latex is controlled by charging the short-stopping agent at a constant rate ino the effluent stream wihdrawn from the polymerization reaction zone. Conversion is controlled by changing the short-stop addition point manually and thereby changing the effective reactor hold-up time. With latex produced at a constant rate, there is always a constant proportion of short-stop to latex.

When the rate of withdrawal of latex from the polymerization reactor fluctuates, it is no longer possible to maintain a substantially constant ration of short-stopping agent to latex by charging short-stop at a substantially constant rate into the reactor effluent. It thus becomes necessary to determine the rate of flow of latex from the reactor and to introduce the short-stopping agent into the reactor effluent at such a rate so as to maintain the ratio of short-stopping agent to latex substantially constant. A conventional fluid rate of flow measuring device employing an orifice cannot be utilized for determining the rate of flow of the effluent latex as the latex contains solid material which will tend to plug the orifice.

Accordingly, an object of my invention is to provide a method and apparatus for blending two fluid streams. Another object of my invention is to provide a method and apparatus for blending two fluid streams wherein one of said fluid streams contains solid material.

Another object of my invention is to provide a method and apparatus for blending latex and a short-stopping agent.

Other objects, advantages and features of my invention will be readily apparent to those skilled in the art from the following description, the drawing and appended claims.

In one embodiment of my invention, I have provided a method and apparatus for blending two fluid streams wherein the pressure drop across a first valve in a first conduit is maintained constant, and the position of said first valve and a second valve in a second conduit communicating with said first conduit downstream of said first valve is manipulated responsive to an upstream pressure in said first conduit. In another embodiment, the upstream pressure in the first conduit is employed to control the rate of flow through the first conduit by manipulating a variable speed pump in the first conduit.

The invention is broadly applicable to the blending of two fluid streams, but is particularly applicable to the blending of two fluid streams wherein one of said fluid streams contains solid material tending to plug an orifice employed by a conventional rate of flow measuring means. Although not to be limited thereto, the invention will hereinafter be described as it is applied to the blending of a short-stopping agent with a latex to provide a blending mixture wherein the proportion of short-stopping agent to latex is maintained substantially constant.

FIGURE 1 is of the drawing is a schematic representation of one embodiment of the invention. FIGURE 2 is a schematic representation of a second embodiment.

Referring to FIGURE 1, a feed material comprising, for example, an emulsion of butadiene, styrene, water and other ingredients from an upstream polymerization reactor wherein the butadiene and styrene have been partially polymerized, are passed via conduit means 10 to reactor 11. Within reactor 11, the polymerization continues until the desired degree of polymerization as predetermined is obtained. The latex effluent is withdrawn from reactor 11 via conduit means 12 and passed via pump means 13 and conduit means 14 to a subsequent processing step, not herein illustrated.

A liquid short-stopping agent or a solution containing a suitable short-stopping agent such as hydroquinone, an aliphatic mercaptan, or an N-substituted dithiocarbamate is passed via conduit means 16 and valve means 17 to conduit means 14 where said short-stopping agent is blended with the latex withdrawn from reactor 11.

Having described process flow, the method and apparatus for blending the latex and short-stop agent liquid stream will now be described. The latex is withdrawn from reactor 11 via conduit means 12 and passed via pumping means 13 through conduit means 14 so as to provide a substantially constant pressure in conduit 14 upstream of valve 18. A suitable pumping means capable of maintaining a constant pressure in conduit 14 is a centrifugal pump. A constant pressure downstream in conduit 14 downstream of valve 18 is maintained by a conventional pressure recorder-controller 19 opening and closing valve 20 responsive to a pressure measurement in conduit 14 and a set point introduced into pressure recorder-controller 19. The set point introduced into pressure recorder-controller 19 is representative of a desired pressure to be maintained in conduit 14 downstream of valve 18 so as to maintain a substantially constant pressure drop across valve 18.

As illustrated, a pressure measurement is made within conduit 12 representative of the liquid head pressure within reactor 11. It is understood by those skilled in the art that for a pressure measurement in conduit 12 to be representative of a liquid pressure in reactor 11, the vapor pressure within reactor 11 must be maintained substantially constant. It is within the scope of this invention to maintain the vapor pressure within reactor 11 substantially constant by conventional means such as a vent control means communicating with the upper region of reactor 11.

A signal representative of the liquid pressure in conduit 12 and reactor 11 is passed to a conventional pressure recorder-controller 21. Responsive to this signal and a set point signal hereinafter described, pressure recorder-controller 21 opens and closes valve 18, thereby manipulating the rate of flow through valve 18 so as to maintain the liquid level within reactor 11 at a predetermined substantially constant level.

In addition thereto, pressure recorder-controller 21 transmits a set point signal to a conventional flow recorder-controller 22. Flow recorder-controller 22 opens and closes valve 17 responsive to a rate of flow measurement in conduit 16 at a set point signal received from pressure recorder-controller 21, thereby maintaining the ratio of additive (short-stopping agent) to latex in conduit 14 substantially constant.

By maintaining the pressure drop across valve 18 substantially constant, in the heretofore described manner, it can readily be seen that the signal transmitted by pressure recorder-controller 21 to valve 18 and flow recorder-controller 22 is representative of the rate of flow through valve 18. The signal received by flow recorder-controller 22 from pressure recorder-controller 21, while representative of the rate of flow through valve 18, is also representative of a desired rate of flow of additive through valve 17 so as to maintain the ratio of additive to latex in conduit 14 substantially constant.

The liquid level in reactor 11 is controlled so as to provide a predetermined degree of polymerization within recator 11. A conventional analyzer 23 determines the extent of polymerization in the latex flowing through conduit 14 and transmits a set point signal to pressure recorder-controller 21 so as to maintain a constant degree of polymerization of the latex flowing through conduit 14. For example, as the degree of polymerization of the latex flowing through conduit 14 exceeds the desired control level, pressure recorder-controller 21 is reset to increase the flow of fluid through valve 18, thereby lowering the liquid level within reactor 11. Analyzer 23 can measure the solids content in the stream flowing through conduit 14, for example. A suitable analyzer for this purpose is one which passes penetrating radiation through the stream and measures the transmitted radiation.

Although the foregoing embodiment of this invention has been described as applied to the blending of two liquid streams, it is within the scope of this invention to also blend gaseous streams. When blending gaseous streams, pumping means 13 becomes a means for compressing a gas flowing through conduit means 12. The pressure measurement in conduit 12 then becomes a property representative of the gaseous pressure in conduit 12.

Although as herein illustrated the pressure measurement in conduit 12 is also representative of the liquid head pressure in reactor 11, it is readily evident to those skilled in the art that the practice of this invention is not limited to the blending of a liquid withdrawn from a vessel with another fluid. Without reactor 11, the pressure measurement in conduit 12 can be utilized to manipulate the rate of fluid flow through valve 18 in the heretofore described manner, with the rate of fluid flow through valve 18 further controlled by a measurement representative of the composition of the fluid flowing through conduit 14 as previously described.

A second embodiment of the blending system of this invention is illustrated schematically in FIGURE 2. The system of FIGURE 2 is similar in many respects to that of FIGURE 1, and corresponding elements are designated by like reference numerals. In FIGURE 2, a positive displacement pump 30 is employed to transfer material from conduit 12 to conduit 14. Pump 30 is driven by steam actuated drive mechanism 31. Steam is introduced into mechanism 31 by a conduit 32 which has a control valve 33 therein. Valve 33 is manipulated by the output signal from pressure recorder-controller 21. The opening of valve 33 increases the rate of flow of steam to mechanism 31 and thus increases the speed of operation of pump 30 to transfer material at a greater rate. Positive displacement pump 30 offers an advantage in that there is less tendency for latex to coagulate than in a pump which provides substantial agitation. Otherwise, the system of FIGURE 2 operates in the same manner as FIGURE 1, it being understood that reactor 11 and the flow control mechanism associated with valve 20 can be employed. In place of the steam drive, a variable speed motor can be employed to drive pump 30. In this case, the speed of the motor is regulated by controller 21.

As will be evident to those skilled in the art, various modifications of this invention can be made, or followed, in the light of the foregoing disclosure, without departing from the spirit or scope thereof.

What is claimed is:

1. A method of blending first and second fluid streams in a desired ratio without measuring the flow rate of the first stream, which comprises passing said first fluid through a conduit means; passing said second fluid into said conduit means; measuring the pressure of said first fluid in said conduit means at a first region upstream of the point of addition of said second fluid; and manipulating in response to said measured pressure (1) the rate of flow of said first fluid through said conduit means at a second region upstream of the point of addition of said second fluid and downstream of said first region and (2) the rate of flow of said second fluid into said conduit means to maintain the ratio of said first fluid to said second fluid substantially constant at said desired ratio.

2. The method of claim 1 wherein said first fluid is passed through a valve which is located in said conduit means downstream of said first region and upstream of said point of addition, and further comprising the step of maintaining the pressure drop across said valve substantially constant.

3. The method of claim 1, further comprising measuring a property of said first fluid, at a point upstream of the point of addition of said second fluid, which property is representative of the composition of said first fluid; and further manipulating said rate of flow of said first fluid and said rate of flow of said second fluid, responsive to said measured property.

4. The method of claim 1 wherein said first fluid comprises a latex and said second fluid comprises a short-stopping agent.

5. Apparatus for blending first and second fluids at a desired ratio thereof without requiring a measurement of the flow rate of said first fluid, comprising first conduit means adapted to convey said first fluid; second conduit means communicating with said first conduit means to introduce said second fluid into said first fluid; a pump in said first conduit means upstream of the junction of said first and second conduit means; means for measuring the pressure of the fluid in said first conduit means upstream of said pump; means for regulating the rate of flow of said first fluid through said first conduit means at a region upstream of said junction and downstream of the region at which the pressure is measured, responsive to said means for measuring pressure; and means for regulating the rate of flow of said second fluid through said second conduit means, responsive to said means for measuring pressure to maintain the ratio of said first fluid to said second fluid substantially constant at said desired ratio.

6. The apparatus of claim 5 wherein said pump is a variable flow rate pump, and wherein said means for regulating flow of said first fluid comprises means to adjust said variable flow rate pump.

7. The apparatus of claim 6 wherein said pump is a positive displacement pump, and said means to adjust regulates the speed of operation of said pump.

8. The apparatus of claim 7 wherein said pump is actuated by a steam drive means, and wherein said means to adjust regulates the rate of flow of steam to said steam drive means.

9. The apparatus of claim 5, further comprising means connected to said first conduit means upstream of the junction of said first and second conduit means to measure the composition of the fluid in said first conduit means; and means for adjusting said means for regulating said rate of flow of said first fluid and said means for regulating rate of flow of said second fluid, responsive to said means to measure composition.

10. The apparatus of claim 5 wherein said means for regulating flow through said first conduit means includes a valve in said first conduit means between said pump and the junction of said first and second conduit means, means for maintaining a substantially constant pressure drop across said valve, and means to adjust said valve in response to said means for measuring pressure.

11. The apparatus of claim 10 wherein said pump is a centrifugal pump, and said means for maintaining a substantially constant pressure drop includes pressure control means in said first conduit means downstream of the junction of said first and second conduit means.

References Cited
UNITED STATES PATENTS

| | | | |
|---|---|---|---|
| 2,615,010 | 10/1952 | Troyan | 260—96 X |
| 3,095,887 | 7/1963 | Lupfer | 137—3 |
| 3,123,004 | 3/1964 | Irvin et al. | 103—16 |
| 3,276,460 | 10/1966 | Feld | 137—7 X |

WILLIAM F. O'DEA, Primary Examiner

DAVID J. ZOBKIW, Assistant Examiner

U.S. Cl. X.R.

137—3, 9, 12, 87, 93; 260—24.7, 96